United States Patent
Subotic et al.

(10) Patent No.: US 6,775,520 B2
(45) Date of Patent: Aug. 10, 2004

(54) SYNTHETIC-APERTURE COMMUNICATIONS RECEIVERS

(75) Inventors: Nikola Subotic, Ann Arbor, MI (US); Christopher Roussi, Kalamazoo, MI (US); Joseph Burns, Ann Arbor, MI (US)

(73) Assignee: Altarum Institute, Ann Arbor, MI (US)

( * ) Notice: Subject to any disclaimer, the term of this patent is extended or adjusted under 35 U.S.C. 154(b) by 0 days.

(21) Appl. No.: 10/348,736

(22) Filed: Jan. 22, 2003

(65) Prior Publication Data

US 2003/0142001 A1 Jul. 31, 2003

Related U.S. Application Data

(60) Provisional application No. 60/350,788, filed on Jan. 22, 2002.

(51) Int. Cl.$^7$ .......................... H04B 15/00; G01S 13/90
(52) U.S. Cl. ...................... 455/63.1; 342/25; 375/130; 375/219; 375/316; 375/346; 455/3.01; 455/3.05; 455/403; 455/422.1; 455/423; 455/424; 455/425; 455/39; 455/500; 455/501; 455/67.11; 455/67.13; 455/550.1; 455/130; 455/296
(58) Field of Search ........................ 455/403, 422.1, 455/423–425, 39, 550.1, 130, 296, 3.01–3.06, 426, 2, 427–431, 500–506, 59, 63.1, 67.11, 67.13, 114.2, 115.1, 115.3, 12.1, 136, 456.21, 456.5; 342/52, 57, 58, 60, 89–93, 147, 159, 165, 173–175, 194, 195, 25; 375/130–153, 219, 220, 316, 346, 347, 377

(56) References Cited

U.S. PATENT DOCUMENTS

| | | | | |
|---|---|---|---|---|
| 3,646,443 A | * | 2/1972 | Bickford et al. | 455/504 |
| 3,676,778 A | * | 7/1972 | Mori | 455/12.1 |
| 4,287,598 A | * | 9/1981 | Langseth et al. | 455/505 |
| 4,956,864 A | * | 9/1990 | Brockman | 455/136 |
| 5,809,063 A | * | 9/1998 | Ashe et al. | 375/141 |
| 6,275,705 B1 | * | 8/2001 | Drane et al. | 455/456.2 |
| 6,522,890 B2 | * | 2/2003 | Drane et al. | 455/456.5 |

\* cited by examiner

*Primary Examiner*—Bernarr Earl Gregory
(74) *Attorney, Agent, or Firm*—Gifford, Krass, Groh, Sprinkle, Anderson & Citkowski, PC

(57) ABSTRACT

The relative movement of a receiver and transmitter in a communications system is used to advantage by electronically synthesizing a larger apparent antenna aperture, thereby increasing signal-to-noise ratio. The approach may be used regardless of whether the transmitter is fixed and the user or vehicle is moving, or the user or vehicle is fixed and the transmitter is moving. According to the method, the apparent angle between the receiver and transmitter is determined relative to the direction of movement and used to produce time-delayed replicas of the received signaling stream which are coherently added to synthesize the increased apparent receiver antenna aperture. Since only the receiver is modified according to the invention, existing transmitters and infrastructures can be used without modification. Although some data buffering is required, only a few number of beams need to be synthesized, in contrast to more complex military SAR configurations.

14 Claims, 2 Drawing Sheets

SYNTHETIC-APERTURE COMMUNICATIONS RECEIVERS

REFERENCE TO RELATED APPLICATION

This application claims priority from U.S. Provisional Patent Application Serial No. 60/350,788, filed Jan. 22, 2002, the entire content of which is incorporated herein by reference.

BACKGROUND OF THE INVENTION

Users of various forms of communications are constantly in need of increased channel capacity and bandwidth so that more information can be transmitted between nodes. Maps, imagery, voice, e-mail and other types of information now need to be transmitted between vehicles, satellites, and base stations, both fixed and airborne. At the same time, security concerns require encryption of the certain information, which exacerbates the problem of channel capacity in communication systems.

In its simplest form, the channel capacity of a communications system may be given as:

$$C = B \log_2(1 + SNR)$$

where B is the link bandwidth and SNR is the signal-to-noise ratio of the communications link. SNR can be expressed in terms of many of the driving parameters of the system as:

$$SNR = \frac{\gamma P_t g_t g_r}{4\pi^2 N}$$

where $P_t$ is the transmitter power, r is the distance between the transmitter and receiver, N is the noise power, and $g_t$ and $g_r$ are the antenna gains of the transmitter and receiver, respectively. The antenna gain can be related to the antenna aperture size via:

$$g \cong \frac{4\pi LW}{\lambda^2}$$

where $\lambda$ is the wavelength of radiation and L,W are the length and widths of the (assumed rectangular) antenna.

Based on the above equations, there are multiple approaches to increasing channel capacity, including: 1) finding new degrees of freedom to be used in the communication channel, such as polarization, higher frequencies; 2) increasing bandwidth; and 3) increasing the signal-to-noise ratio of the current communication link.

Increasing the signal-to-noise ratio in a communications system can be addressed in a number of ways. Some approaches are more direct than others. Two simple methods of increasing the signal-to-noise ratio are; 1) to increase the transmitter signal power and/or 2) make the communication link physically shorter. In many instances, these approaches are not feasible.

Another approach is to increase the apparent aperture of the antenna system. This can be done physically whereby a larger antenna aperture is used. As with increasing the transmitter power, however, this approach may also not be feasible in many applications. In mobile and satellite communication systems, transmitters and receivers move relative to one another. This can be viewed as a drawback, or this relative movement can be used as an opportunity to incorporate some rather sophisticated signal processing to improve performance.

SUMMARY OF THE INVENTION

Broadly, this invention exploits the relative movement of a receiver and transmitter in a communications system by electronically synthesizing a larger apparent antenna aperture, thereby increasing signal-to-noise ratio.

A preferred embodiment is disclosed wherein the aperture is synthesized via pulse-to-pulse coherence in a cellular communications receiver moving relative to a fixed transmitter. However, the aperture may be synthesized more broadly through angular diversity due to motion, regardless of whether the transmitter is fixed and the user or vehicle is moving, or the user or vehicle is fixed and the transmitter is moving, as would be the case with an airborne transmitter or geosynchronous satellite. The invention is further applicable to the case where both the receiver and transmitter are both moving, as would be the case with a vehicle downloading from a satellite, for example.

Although in this example the aperture is synthesized via pulse-to-pulse coherence in a receiver moving relative to a fixed transmitter, the aperture may be synthesized more broadly through angular diversity due to motion, regardless of whether the transmitter is fixed and the user or vehicle is moving, or the user or vehicle is fixed and the transmitter is moving, as would be the case with an airborne transmitter or geosynchronous satellite.

In terms of operation, a method of improving the performance of a receiver according to invention would include the steps of determining the apparent angle between the receiver and transmitter relative to the direction of movement, using the apparent angle to produce time-delayed replicas of the received signaling stream, and coherently adding the time-delayed replicas of the signaling stream to synthesize the increased apparent receiver antenna aperture.

The apparent angle may be estimated in different ways. For example, a Doppler shift in the carrier frequency may be determined due to the relative motion, and the apparent angle may be found as a function of the Doppler shift. Alternatively, the apparent angle may be determined as a function of the time delay of the arrival of the signaling stream.

Since only the receiver is modified according to the invention, existing transmitters and infrastructures can be used without modification. Significant cost potentials can be realized via economy of scale, due to relatively simple FFT processing. Although some data buffering is required, only a few number of beams need to be synthesized, in contract to more complex military SAR configurations. Use of the inventive technology lowers antenna side lobes, resulting in a higher signal to noise ratio, which, in turn, may provide for better reception, more users at a given time, and enhanced services such as image/video capabilities, which are currently problematic to implement.

DETAILED DESCRIPTION OF THE INVENTION

Figure 1:
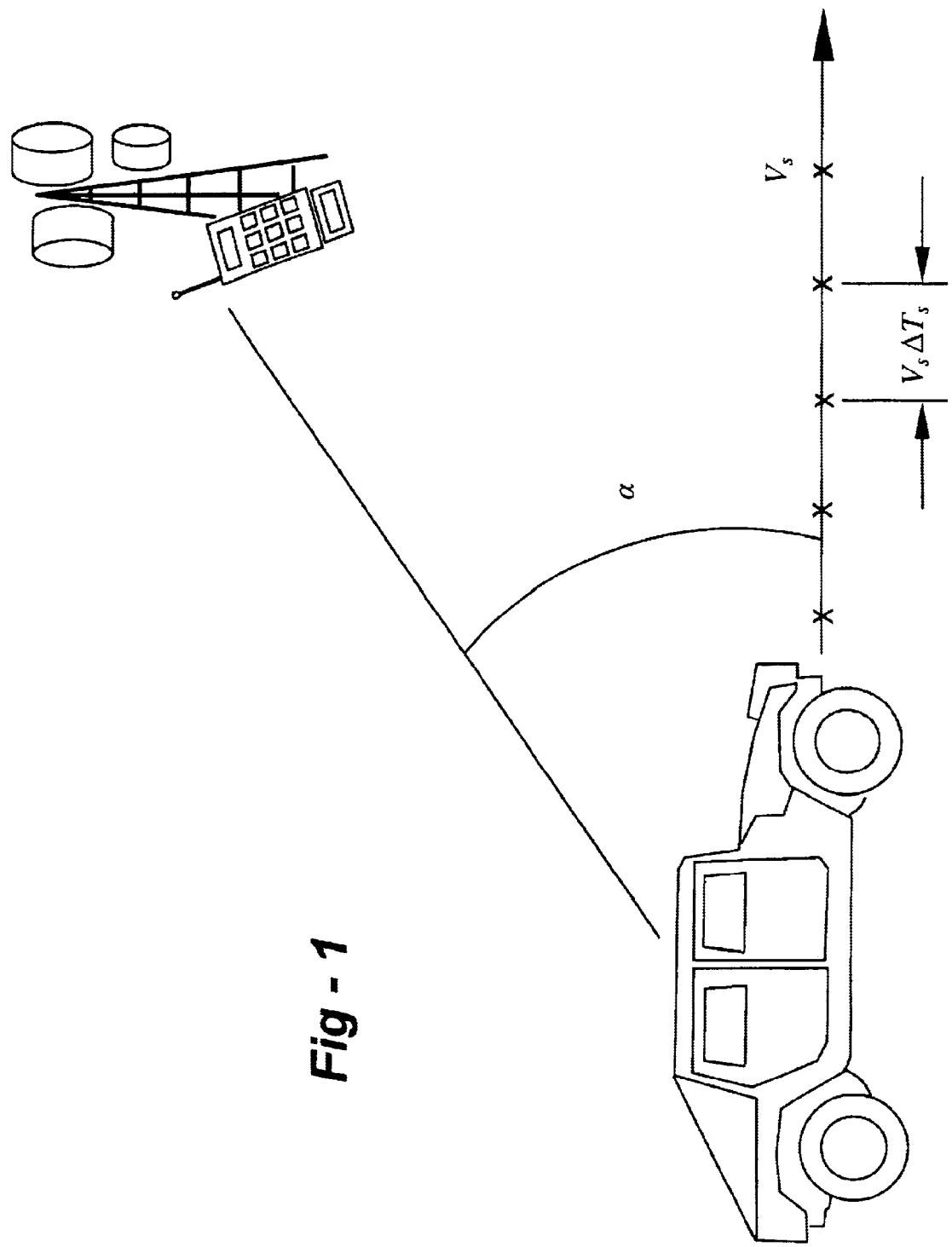
FIG. 1 is a diagram that depicts a transmitter/receiver geometry applicable to the invention.

This invention exploits the relative motion between a communications transmitter and receiver to coherently synthesize a larger apparent antenna aperture and increase system's signal-to-noise ratio. Instead of being limited by the physical size of the antenna aperture, the antenna gain can now be expressed as:

$$g \cong \frac{4\pi v t W}{\lambda^2}$$

where v is the relative velocity between the transmitter/receiver, and t is the synthetic aperture integration time.

The concept features at least the following potential benefits:
1. Increases communications channel capacity
   Higher SNR thru beamformed antenna gain
   Lower antenna sidelobes thru filled aperture 2. Lower required transmitter power
3. Longer system standoff
4. More users on a particular communications channel The use of synthetic apertures is well known in the art of radar signal processing. Synthetic aperture radar (SAR) has been employed for over 40 years in military imaging surveillance radars. See, for example, Synthetic Aperture Radar Systems & Signal Processing, by John C. Curlander and Robert N. McDonough, John Wiley & Sons, Inc., 1991.

With synthetic aperture radar, a large real beam antenna pattern (due to the small physical size of the antenna) is replaced by an array of very narrow beams (each corresponding to a pixel in the image). The very narrow beams result from the much larger apparent aperture size of the antenna after aperture synthesis. The image here is two-dimensional, wherein range compression (the use of bandwidth) is also used. This invention utilizes a one-dimensional approach, wherein only angular compression is affected.

The inventive approach is a rather radical departure for the communications community. Typically, communications channels employ pseudo-noise codes which, as the name implies, have uncorrelated, noise-like properties. Consequently, receiver structures have been formulated as incoherent systems and coherent systems which only correct for the message phase (see Wideband CDMA for Third Generation Mobile Communications, T. Ojanpera and R. Prasad, Artech House, Boston, Mass., 1998). However, these properties are present for other users who do not have a local means of reproducing that particular pseudo-noise sequence. In a cooperative environment where both the transmitter and receiver know the sequence, the system can be treated coherently.

A receiver structure according to the invention attempts to re-format the data in the following manner: First, due to the relative motion between the transmitter and receiver, there is an induced Doppler shift on the data. In phase-shift-keying based systems, a Doppler shift on the carrier frequency has the effect of scaling (dilating or eroding) the phase transition points which skews the chipping rate of the signal. This reduces the correlation gain in the receiver. Consequently, the Doppler shift must be estimated and the carrier frequency remodulated in the data effectively correcting the instantaneous phase.

In direct-sequence, spread-spectrum communications, the Doppler shifted carrier frequency may be estimated as:

$$2\hat{f}_D = \max_a \int s(t+\tfrac{\tau}{2})s^*(t-\tfrac{\tau}{2})e^{i4\pi a t}dt - 2f_c$$

where $\theta_D$ is the estimated Doppler shift, $\theta_c$ is the signal carrier frequency and s(t) is the incident spread spectrum signal.

The apparent angle between the transmitter and receiver antennas, $\alpha$, must also be estimated. FIG. 1 shows the transmitter/receiver geometry. This angle can be measured via knowledge of the vehicle velocity, $v_s$ as:

$$\hat{\alpha} = \sin^{-1}\left(\frac{c\hat{f}_D}{2f_c v_s}\right)$$

An estimate of $\alpha$ can also be made directly without the Doppler shift via time delay of arrival as:

$$\hat{\alpha} = \frac{1}{N-1}\sum_{n=2}^{N}\sin^{-1}\left(\frac{c[\Delta T_s + \partial t_n]}{v_s \Delta T_s}\right)$$

where N equally spaced temporal/spatial samples are used with $\Delta T$, the temporal sampling rate and a constant vehicle velocity is assumed. The time slippage a $\partial t_n$, between the cross correlation of the received signal s(t) and the local replica of the spreading code r(t) is calculated via:

$$\partial t_n = \max_t \int s(\tau)r^*(\tau - t)d\tau - \Delta T_s$$

With knowledge of this angle, replicas of the signaling stream can be time delayed or phase shifted, and coherently added to synthesize an apparent antenna aperture increasing system SNR.

Figure 2:
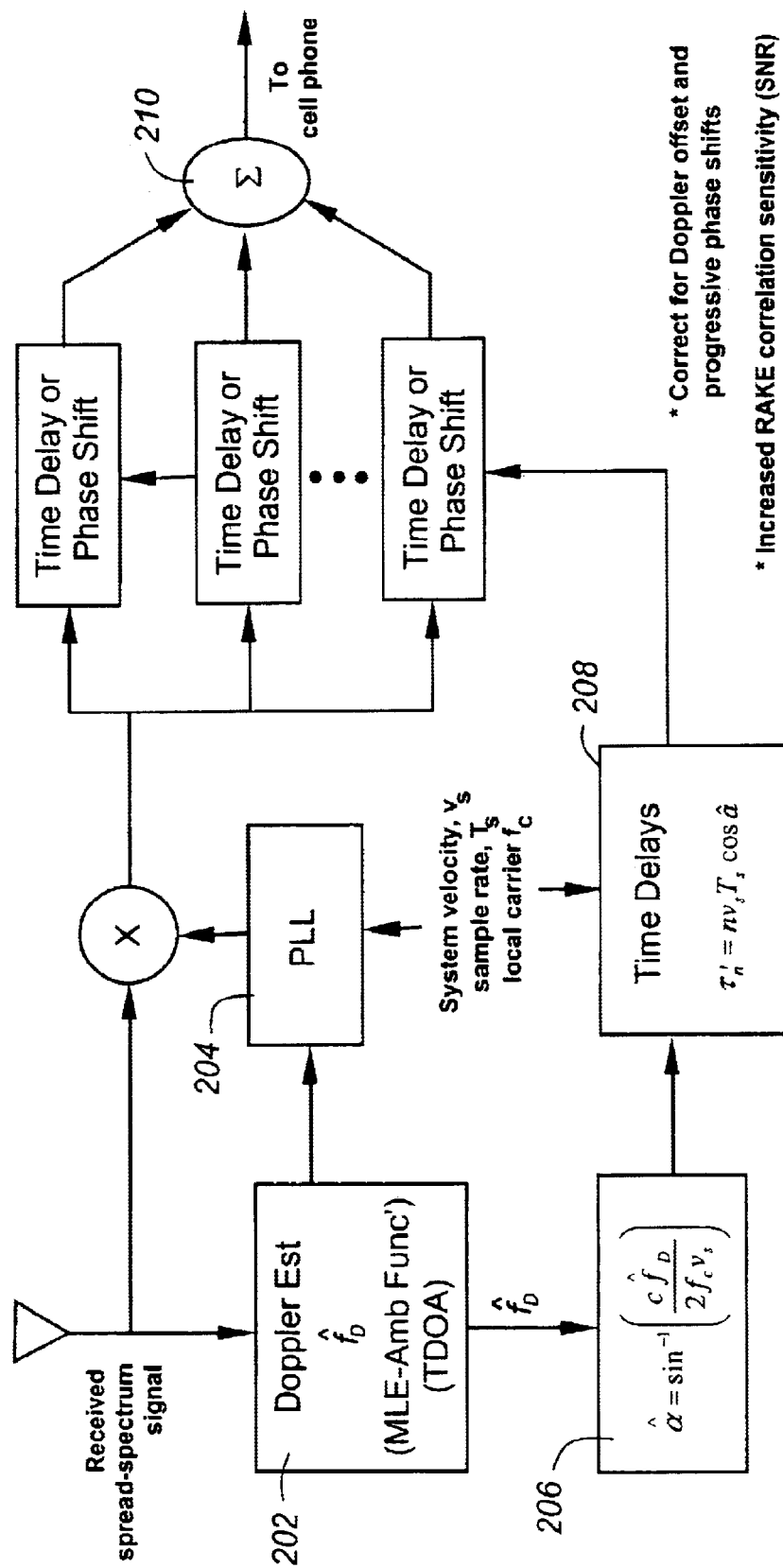
FIG. 2 is a block diagram showing important components in a synthetic aperture receiver according to the invention applicable to a cellular telephone for voice and data communications.

FIG. 2 is a block diagram showing important components in a synthetic aperture receiver according to the invention applicable to a cellular telephone for voice and data communications. It will be appreciate by those of skill in the art of advanced communications that same basic techniques may be applied to other types of receivers, both analog and digital, regardless of the information content, be it voice, data, or video-related. Nor is the invention limited in terms of protocol, and is compatible with CDMA, TDMA, GSM, and yet to be developed formats.

Although in this example the aperture is synthesized via pulse-to-pulse coherence in a receiver moving relative to a fixed transmitter, the aperture may be synthesized more broadly through angular diversity due to motion, regardless of whether the transmitter is fixed and the user or vehicle is moving, or the user or vehicle is fixed and the transmitter is moving, as would be the case with an airborne transmitter or geosynchronous satellite.

In the example of FIG. 2, a signal is received through a conventional antenna and a Doppler estimate is performed at 202. A phase-locked loop utilizing block 204 is preferably used to maintain accurate tuning. At block 206, the angle $\alpha$ is estimated, in this case using vehicle velocity, and time delays, also based upon vehicle velocity and sample rate, are computed at 208. This allows replicas of the received information to be time delayed or phase shifted, and coherently added at 210 to synthesize an apparent antenna aperture and improved performance.

The method and system of the invention offers numerous advantages. Importantly, since only the receiver is modified, existing transmitters and infrastructures can be used without modification. Significant cost potentials can be realized via economy of scale, due to relatively simple FFT processing. Although some data buffering is required, only a few number of beams need to be synthesized, in contract to more complex military SAR configurations. Use of the inventive technology lowers antenna side lobes, resulting in a higher signal to noise ratio, which, in turn, may provide for better reception, more users at a given time, and enhanced services such as image/video capabilities, which are currently problematic to implement.

We claim:

1. A method of improving the performance of a receiver receiving a signaling stream on a camel frequency from a transmitter in an environment wherein relative motion exists between the receiver and transmitter at a velocity and in a direction of movement, the method comprising the steps of;

estimating a Doppler shift in the cattier frequency due to the relative motion;

determining the apparent angle between the receiver and transmitter relative to the direction of movement as a function of the Doppler shift;

using the apparent angle to produce time-delayed replicas of the received signaling stream; and coherently adding the time-delayed replicas of the signaling stream to synthesize an increased apparent receiver antenna aperture.

2. The method of claim 1, wherein the signaling stream is a spread spectrum signaling stream.

3. A method of improving the performance of a mobile cellular communications receiver receiving a signaling stream on a carrier frequency from a stationary transmitter, the method comprising the steps of:

determining the apparent angle between the mobile cellular receiver and the stationary transmitter as a function of the direction of movement of the receiver;

using the apparent angle to produce rime-delayed replicas of the received signaling stream; and coherently adding the time-delayed replicas of the signaling stream to synthesize an increased apparent receiver antenna aperture.

4. The method of claim 3, further including the steps of:

estimating a Doppler shift in the carrier frequency due to the relative motion of the receiver, and determining the apparent angle as a function of the Doppler shift.

5. The method of claim 3, wherein the apparent angle is determined as a function of the time delay of the arrival of the signaling stream.

6. The method of claim 3, wherein the signaling stream is a spread-spectrum signaling stream.

7. A method of improving the performance of a mobile cellular communications receiver receiving a spread-spectrum signaling stream on a carrier frequency from a stationary transmitter, the method comprising the steps of:

estimating a Doppler shift in the carrier frequency due so the relative motion of the receiver; determining the apparent angle between the receiver and transmitter relative to the direction of movement as a function of the Doppler shift;

using the apparent angle to produce time-delayed replicas of the spread-spectrum signaling stream; and coherently adding the time-delayed replicas of the spread-spectrum signaling stream to synthesize an increased apparent receiver antenna aperture.

8. An improved communications receiver in an environment wherein relative motion exists between the receiver and a transmitter at a velocity and in a direction of movement, the improved communications receiver comprising:

an antenna for receiving a signaling stream on a carrier frequency from the transmitter; and a processor operative to perform the following functions:
a) determine the apparent replicas between the receiver and the transmitter as a function of the direction of movement,
b) generate time-delayed replicas of the received signaling stream based upon the apparent angle; and
c) synthesize an increased apparent receiver antenna aperture by coherently summing the time-delayed replicas of the signaling stream.

9. The improved communications receiver of claim 8, wherein the processor is further operative to:

estimate a Doppler shift In the carrier frequency due to the relative motion; and determine the apparent angle as a function of the Doppler shift.

10. The improved communications receiver of claim 8, wherein the processor is further operative to:

estimate the apparent angle us a function of the time delay of the arrival of the signaling stream.

11. The improved communications receiver of claim 8, wherein the signaling stream is a spread spectrum signaling stream.

12. The improved communications receiver of claim 1, wherein the processor is disposed in a vehicle.

13. The improved communications receiver of claim 8, wherein the processor is disposed in a hand-held cellular telephone.

14. The improved communications receiver of claim 8, wherein the transmitter forms part of a satellite.

* * * * *

UNITED STATES PATENT AND TRADEMARK OFFICE
CERTIFICATE OF CORRECTION

PATENT NO. : 6,775,520 B2
DATED : August 10, 2004
INVENTOR(S) : Nikola Subotic

It is certified that error appears in the above-identified patent and that said Letters Patent is hereby corrected as shown below:

Title page,
Item [57], ABSTRACT,
Line 15, replace "modification. Although" with -- modification. Significant cost potentials can be realized via economy of scale, due to reltive simple FFT processing. Although --.
Line 17, replace "configurations." with -- configurations. Use of the inventive technology lowers antenna side lobes, resulting in a higher signal to noise ratio, which, in turn, may provide for better reception, more users at a given time, and enhanced services such as image/video capabilities, which are currently problematic to implement. --

Column 3,
Line 63, replace "$\Theta_D$" with -- $f_D$ --.
Line 63, replace "$\Theta_c$" with -- $f_C$ --.

Column 5,
Line 3, replace "camel" with -- carrier --.
Line 6, replace "of;" with -- of: --.
Line 7, replace "cattier" with -- carrier --.
Line 26, replace "rime-delayed" with -- time-delayed --.
Line 46, replace "due so" with -- due to --.
Line 47, replace "receiver; determining the" with -- receiver;
                                          [new paragraph] determining the --.

Column 6,
Line 18, replace "replicas" with -- angle --.
Line 27, replace "In" with -- in --.

Signed and Sealed this

Twelfth Day of April, 2005

JON W. DUDAS
*Director of the United States Patent and Trademark Office*